(12) United States Patent
Matyas et al.

(10) Patent No.: US 6,505,302 B1
(45) Date of Patent: Jan. 7, 2003

(54) AUTHENTICATION FOR SECURE DEVICES WITH LIMITED CRYPTOGRAPHY

(75) Inventors: Stephen M. Matyas, Manassas, VA (US); Sean William Smith, Cornwall, NY (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 09/644,184

(22) Filed: Aug. 23, 2000

Related U.S. Application Data (62) Division of application No. 08/921,442, filed on Aug. 29, 1997.

(51) Int. Cl.$^7$ ................................................. H04L 9/32
(52) U.S. Cl. .................. 713/169; 713/173; 713/192; 380/25; 380/30
(58) Field of Search ............................... 713/169, 192, 713/173; 380/30, 25, 21

(56) References Cited

U.S. PATENT DOCUMENTS

| 4,759,062 A | 7/1988 | Traub et al. |
| 5,539,828 A | 7/1996 | Davis |
| 5,557,518 A | 9/1996 | Rosen |
| 5,610,980 A | 3/1997 | Johnson et al. |
| 5,787,172 A | 7/1998 | Arnold |
| 6,088,797 A | 7/2000 | Rosen |

*Primary Examiner*—Thomas R. Peeso
(74) *Attorney, Agent, or Firm*—Scully, Scott, Murphy & Presser; Douglas W. Cameron, Esq.

(57) ABSTRACT

Authentication is provided for secure devices with limited cryptography, particularly for devices which do not have the capability to do public-key cryptography and generate random numbers. An initialization process is disclosed for limited-power Devices which are unable to perform public-key cryptography and generate random-numbers, as well as for full-power Devices which have the capability to do public-key cryptography and generate random numbers. A Challenge-Response procedure is also disclosed for ensuring the secure state of a device.

8 Claims, 7 Drawing Sheets

AUTHENTICATION FOR SECURE DEVICES WITH LIMITED CRYPTOGRAPHY

This application is a divisional of copending application Ser. No. 08/921,442. Filed on Aug. 29, 1997.

BACKGROUND OF THE INVENTION

Field of the Invention

The present invention relates generally to authentication using secure devices with limited cryptography, and more particularly pertains to authentication using secure devices with limited cryptography which no longer have the capability to do public-key cryptography and generate random numbers.

The present invention relates to computational devices that are secure, in the sense that they carry out correct computation (which may include storage and controlled usage of secrets) despite attacks by skilled and potentially well-funded adversaries.

When deployed, these computational devices interact with various authorities. In many scenarios, it is necessary for an authority to verify that a communication from an allegedly untampered computational device is genuine, and/or a computational device to verify that a communication allegedly from a particular authority is genuine.

Many strong and flexible techniques exist for this task. However, failures and other problems may leave these devices too crippled to perform these tasks. Two such failure scenarios are:

The computational device's capability to perform public-key cryptography and random-number generation depends on software that is stored in rewritable media, and which may fail, leaving the device without these capabilities.

Various zeroization scenarios may cause an otherwise untampered computational device to lose knowledge of its own certified private key, and/or the authority's public key.

SUMMARY OF THE INVENTION

The present invention provides a way to carry out authentication tasks in computational devices with constrained cryptographic capabilities.

The subject invention provides the following additional benefits:

It avoids the risks and complexities of maintaining a large database of secrets at an authority's site.

It avoids the weaknesses of derived-key approaches.

It easily permits the authority who performs the authentication to differ from the installation authority who performs initialization.

It continues to insulate untampered computational devices from being threatened by the successful compromise of any other computational device.

Accordingly, it is a primary object of the present invention to provide authentication for secure devices with limited cryptography.

A further object of the subject invention is the provision of authentication for secure devices with limited cryptography which no longer have the capability to do public-key cryptography and generate random numbers.

BRIEF DESCRIPTION OF THE DRAWINGS

The foregoing objects and advantages of the present invention for authentication for secure devices with limited cryptography may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

TERMS AND BUILDING BLOCKS

Device. One of the secure computational devices in question.

SKA ("Secret Key Authentication"). Generic name for the type of authentication this invention performs.

Secret-key Encryption Algorithm. A symmetric encryption algorithm (e.g., Data Encryption Standard (DES)) which the Device is able to perform, even when its cryptographic abilities are limited.

Secret-key MAC Algorithm. A message authentication code algorithm which the Device is able to perform, even when its cryptographic abilities are limited.

Public-key Signature Scheme. An algorithm, based on public-key cryptography, for verifying the integrity of a particular message, and the alleged identity of its sender.

Public-key Secrecy Scheme. An algorithm, based upon public-key cryptography, for ensuring that the plain text value of some data remains secret to all but a specially privileged party.

Primary SKA key. A primary key $K_0$ for a particular Device, used to generate the Secondary SKA keys, $K_1$, $K_2$.

Secondary SKA keys. Two additional keys $K_1$, $K_2$ (generated from the primary key $K_0$), used for the Secret-Key Encryption scheme and the Secret-Key MAC scheme, respectively.

Set of Primary SKA keys. A set of such primary keys $K_0$, $K'_0$, ... for a particular device. Each such key can be individually indexed by all concerned parties for use as the primary key in some particular application of this protocol to this device.

SKA Core. A set of one or more Primary SKA Keys, encrypted for secrecy with the public key of the AA.

SKA Certificate. An SKA core, along with identifying information and additional parameters, signed with the private key of the IA.

Installation Authority (IA). The Authority performing the installation of SKA secrets into a Device. The IA possesses a keypair for the Public Key Signature scheme.

Authenticating Authority (AA). The Authority who uses these SKA keys to carry out mutual authentication with the Device. The AA possesses a keypair to the Public Key Secrecy scheme.

Nonce. A data value (ideally, random or somehow unpredictable by an adversary) used to raise a party's confidence in the freshness of messages in an interaction.

SCENARIO: Overall Usage

Figure 1:
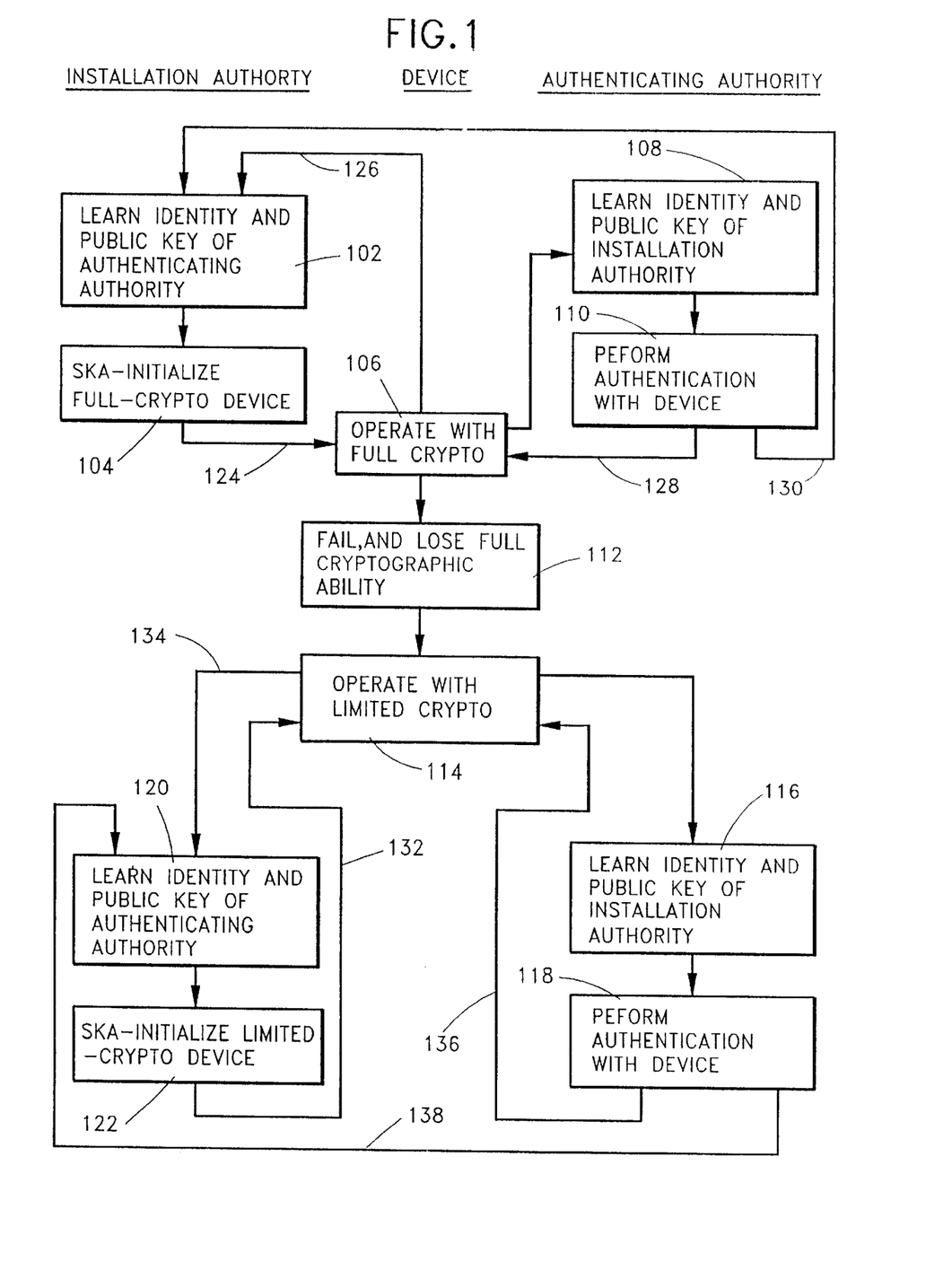
FIG. 1 illustrates an overall view of how the present invention is used.

FIG. 1 illustrates an overall view of how the present invention is used.

We begin by considering Devices that initially have full cryptographic ability. First, the IA initializes the Device at step 104. This process requires that first the IA learns the identity of and the public key of the AA at step 102.

Then, the Device begins normal operation in step 106. If initialization occurred in a secure environment, then the transition (124) to normal operation will usually involve moving the Device into an insecure or hostile environment. At this point, the IA may re-initialize the Device (transition 126), which could involve returning the Device to a secure environment. Also at this point, the AA may wish to perform authentication with the Device (steps 108, 110). After authentication, the device can either return to normal operation (transition 128) or be re-initialized (transition 130). During full-crypto normal operation, the Device could also carry out any other authentication techniques that are possible with its abilities.

Figure 3:
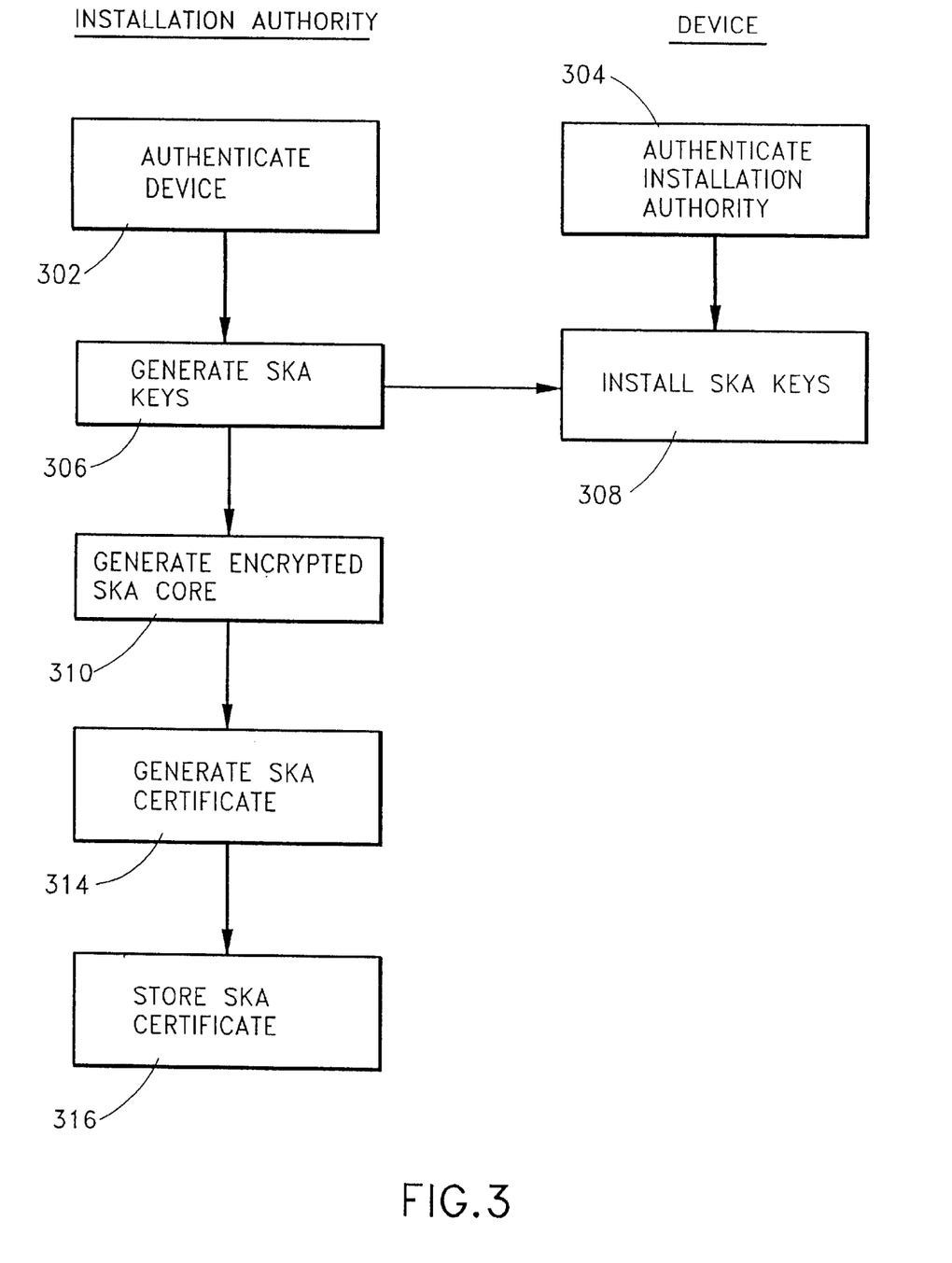
FIG. 3 illustrates the initialization process for limited-power Devices which are unable to perform public-key cryptography and generate random-numbers.

At any point during normal operation, a full-crypto Device may fail (step 112) and begin operation in a limited state (step 114). At this point, the AA may wish to perform authentication with the Device (step 116, 118). (Indeed, the invention was initially developed to support exactly this task.) After authentication, the Device can either return to normal operation (transition 136) or be re-initialized (transition 138); however, the IA must adjust initialization (steps 120, 122) to compensate for the limited abilities of the Device, as illustrated in FIG. 3. Also at any point during limited operation, the IA may also wish to re-initialize the Device (transition 134).

Figure 7:
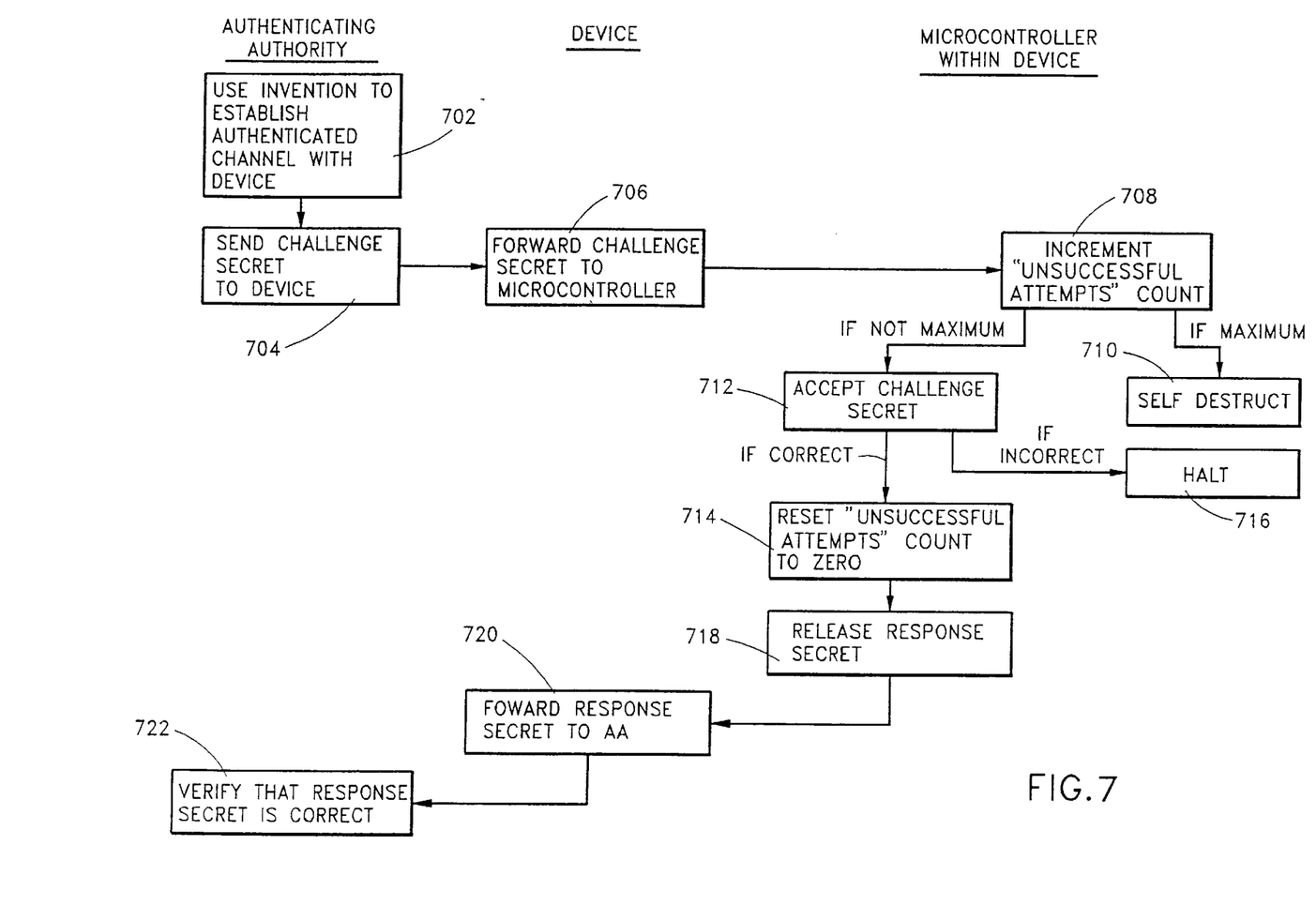
FIG. 7 illustrates a logic flow diagram for the Challenge-Response procedure.

Depending on the type of failure (112) or the nature of the Devices's operating environment, the authentication steps (110, 118) may incorporate the extra challenge-response technique of FIG. 7.

A Device that only has limited cryptographic ability would begin with limited initialization, steps 120 and 122, as illustrated in FIG. 3.

The discussion herein is for the case where a particular Device has one IA and one AA, although many may exist. However, the present invention can easily accommodate situations where a Device may have more than one IA, and/or more than one AA. For example, the IA that performs re-initialization after authentication at step 110 may very well be the same entity as the AA who performed that authentication.

In particular, the present invention relates to computational devices that have two properties that may sometimes change independently.

The first property is its cryptographic ability: the device may have "full" cryptography (e.g., software and/or hardware implementations of symmetric key algorithms, public key algorithms, cryptographically secure hash algorithms, and cryptographically secure random number generation), or "limited" cryptography (e.g., only symmetric key cryptography).

For simplicity, this discussion presents only two states of cryptographic ability, although alternative embodiments of the invention could easily generalize to a full lattice of states.

The second property is security. Is the device genuine, or has it undergone some type of unauthorized tampering, alteration or counterfeiting?

Figure 8:
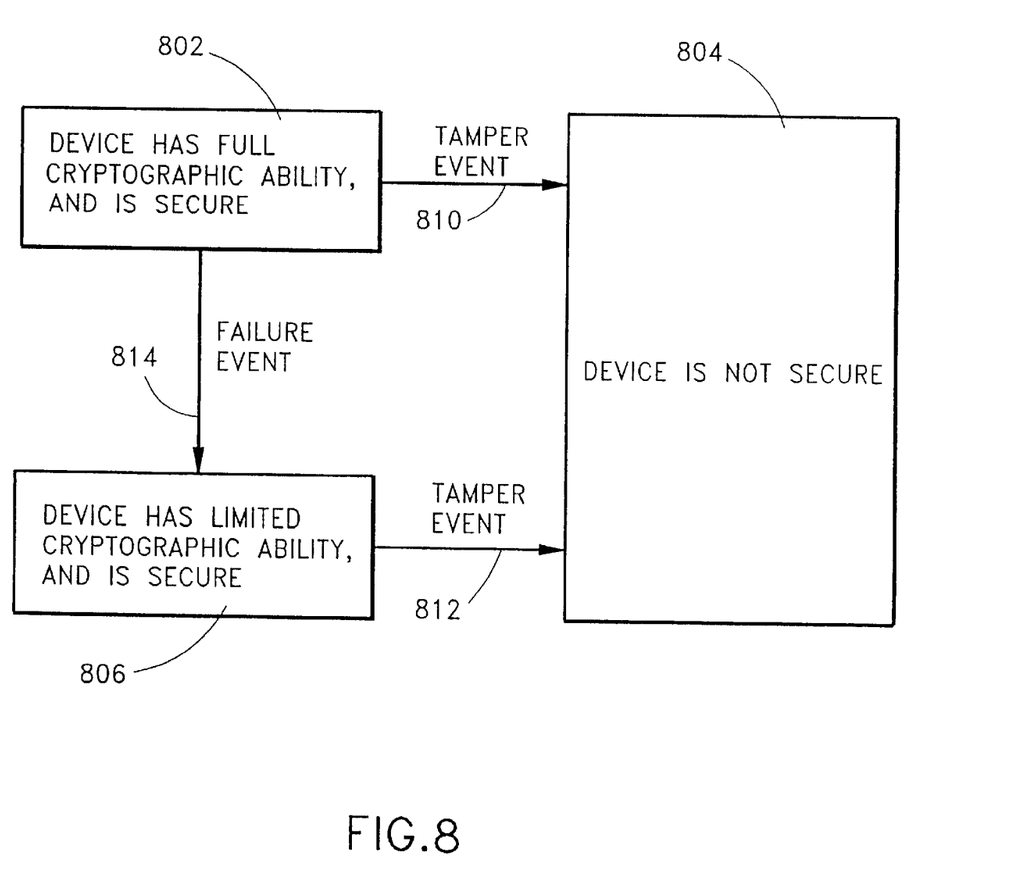
FIG. 8 illustrates the states a device might go through wherein the device may have full cryptography or limited cryptography, or may be secure and genuine or not secure.

FIG. 8 illustrates the states a device might go through with respect to these properties. The device may have full cryptography (802) or limited cryptography (816); the device may be secured and genuine (802, 806) or not secure (814). The device may transition from full to limited cryptography due to a failure event (814) (a device might detect it has undergone a failure transition (814) through any number of standard self-test techniques); the device may transition from secure to not secure due to a tamper event (810, 812). A device might be returned from state 806 to state 802 via a secure code downloading technique, such as the one presented in the concurrent application (Docket YO997-157).

How a device might detect and respond to a tamper event (810, 812) is the subject of much previous work (including patents previously issued to S. Weingart at IBM, and cited in Docket YO997-195).

How an external authority can distinguish between a device in state 802 and one in any other state is the subject of a concurrent patent application (Docket YO997-195), which builds on the earlier tamper response work. However, this technique critically depends on the device having the ability to perform public-key cryptography, and thus an external authority cannot distinguish between states 804 and 806.

The present invention provides an approach whereby an external authority can distinguish between devices in states 804 and 806. This has relevance both to devices whose cryptographic abilities may change, as well as to devices that never posses public-key abilities to begin with.

SCENARIO: SKA Initialization, if Device has Full Crypto

The present invention was developed because of a need to authenticate Devices that no longer have the capability to do public-key cryptography and generate random numbers. However, the Device may very well have these capabilities when the IA wishes to perform SKA initialization. Consequently, the initialization process can exploit these capabilities.

Figure 2:
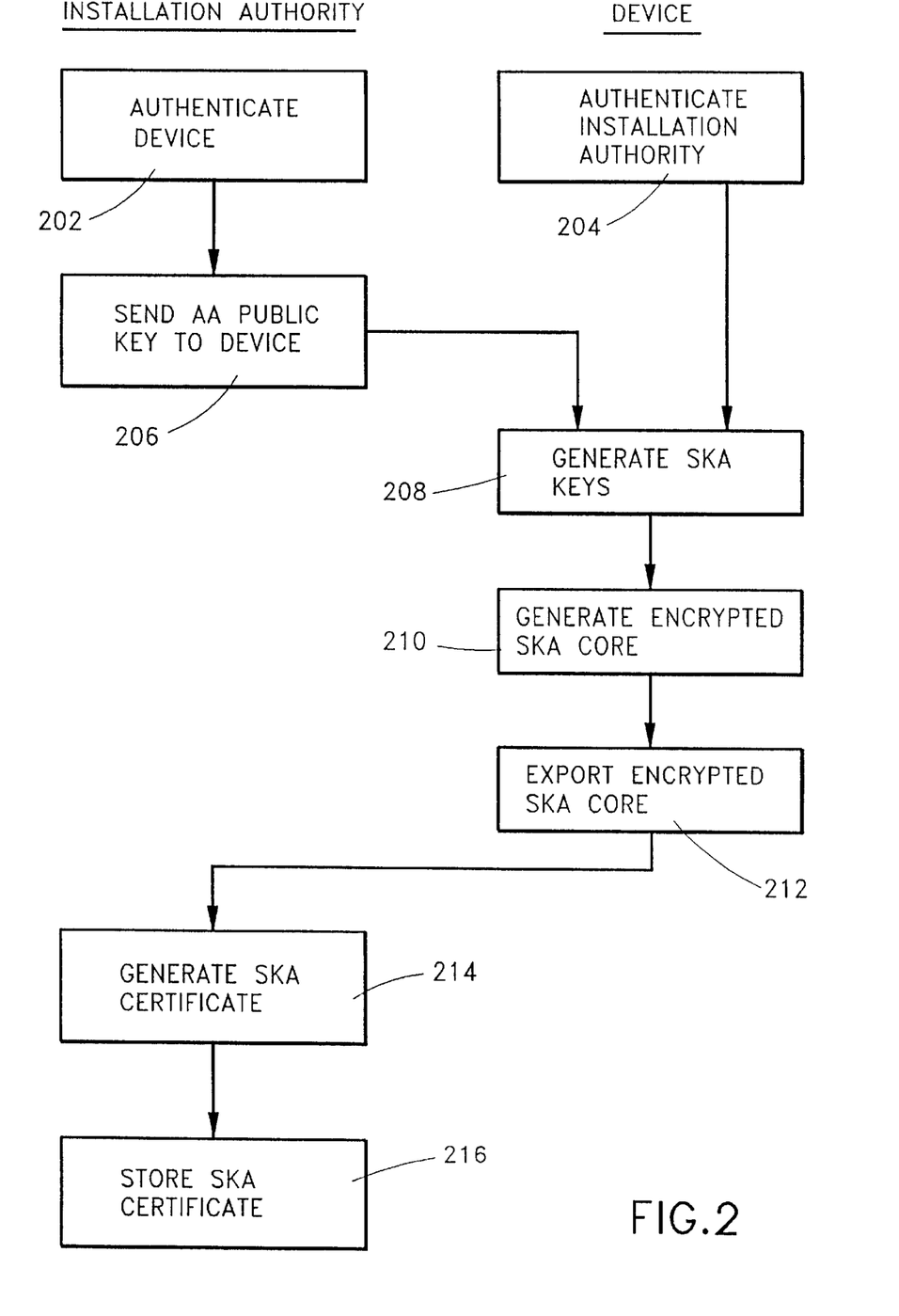
FIG. 2 illustrates how an installation authority (IA) initializes full-power Devices which have the capability to do public-key cryptography and generate random numbers.

FIG. 2 illustrates how the IA initializes such full-power Devices.

First, the IA must authenticate that the Device is untampered and genuine at step 202; and the Device must authenticate the IA as genuine in step 204. This authentication implicitly should establish an authenticated communication path between the IA and the Device.

This task can be performed in many ways, including:

Using the techniques disclosed in patent application (docket YO997-195) to authenticate the Device, and the technique disclosed in patent application (docket YO997-157) to authenticate the authority.

Using the present invention, if the Device has already been initialized at least once. The present invention can be used explicitly for re-initialization, or can be used to enable some other task upon which re-initialization piggybacks (wherein re-initialization is performed as the last step of a task to re-initialize for the next usage).

Using the fact that a newly-manufactured Device is still in a secure area at the manufacturing site.

The IA then sends an authenticated communication into the Device. This communication contains the AA public key, as well as a signal for the Device to begin SKA initialization in step 206.

The Device then uses its random number generator to generate a new set of Primary SKA Keys in step 208.

The Device then enciphers (the process of public-key encipherment can be indirect, following standard practice: the data is first enciphered with a random secret key, which secret key is in turn is enciphered with a public key) these keys with the AA public key, to form the SKA core in step 210. For more flexibility, each SKA key can be enciphered with a different public key.

The Device transmits this Core to the IA in step 212.

The IA takes the SKA core, optionally authenticates the SKA core, and then appends identifying information and other parameters in plaintext, to form the SKA Certificate. The IA signs this certificate with the IA private key in step 214.

The IA then stores the signed SKA Certificate in a manner such that an AA who wishes to authenticate this Device can obtain it in step 216. Options for this storage include:

- the IA communicates the signed SKA Certificate to the Device, which stores it internally, and periodically creates back-up copies external to the Device (a preferred embodiment);
- the IA publishes the SKA Certificate in some reliable public repository.

SCENARIO: SKA Initialization, if Device has Limited Cryptography

Various situations, such as a hardware failure, may render a Device unable to perform public-key cryptography and random-number generation, or possibly the Device never had these abilities initially.

In order to initialize such a Device, the IA follows the same procedure as explained previously, but with some exceptions. FIG. 3 illustrates the initialization process for such limited-power Devices.

First the IA must authenticate that the Device is untampered and genuine in step 302; and the Device must authenticate the IA as genuine in step 304. This authentication implicitly should establish an authenticated communication path between the IA and the Device.

This task can be performed in many ways, including:

Using the procedures of the present invention, if the Device has already been initialized at least once. The present invention can be used explicitly for re-initialization, or can be used to enable some other task upon which re-initialization piggybacks.

Using the fact that a newly-manufactured Device is still in a secure area at the manufacturing site.

The IA then generates a new set of Primary SKA Keys for this Device in step 306. This differs from the previous scenario, where the Device generated the keys itself at step 208. The IA then transmits the new set of primary keys to the Device, which in some embodiments might authenticate the new set of primary keys.

The Device then installs these Primary SKA Keys in secure memory in step 308. The IA enciphers (as before, the process of public-key encipherment can be indirect, following standard-practice: the data is first enciphered with a random secret key, which secret key is in turn is enciphered with a public key) these keys with the AA public key, to form the SKA Core in step 310. As before, for more flexibility, each SKA key can be enciphered with a different public key. These steps differ from the previous scenario, where the Device itself did the enciphering in step 210, 212.

The IA takes the SKA core, appends identifying information and other parameters in plaintext, to form the SKA Certificate. The IA signs this certificate with the IA private key in step 314.

The IA then stores the signed SKA Certificate in a manner such that an AA who wishes to authenticate this Device can obtain it in step 316. Options for this storage include:

- the IA communicates the signed SKA Certificate to the Device, which stores it internally, and which periodically creates back-up copies external to the Device (a preferred embodiment);
- the IA publishes the SKA Certificate in some reliable public repository.

SCENARIO: Authentication

Figure 4:
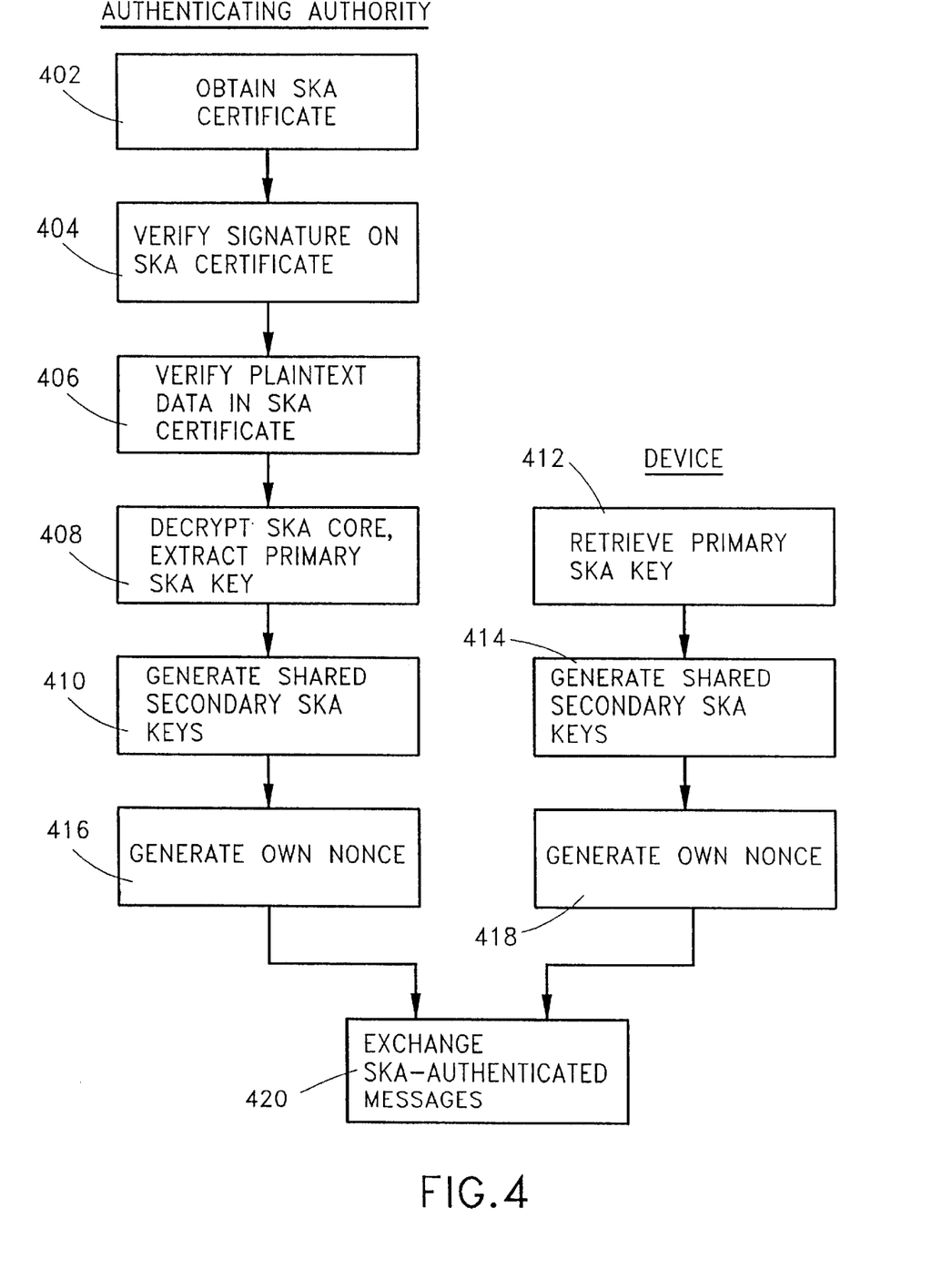
FIG. 4 illustrates how an authenticating authority (AA) performs mutual authentication with a Device.

FIG. 4 illustrates how the AA performs mutual authentication with a Device.

In order to perform mutual authentication with a Device, the AA first obtains the SKA Certificate for the Device in step 402. In a preferred embodiment, this is done by directly querying the Device.

The AA then uses the known public key of the IA to verify the signature on the SKA Certificate in step 404. The AA may also check the other identifying information contained in the plaintext area of the certificate in step 406.

If these checks are satisfactory, then the AA can be assured that the SKA Certificate is authentic. The AA then uses its own private key to decrypt the SKA Core and extract the appropriate Primary SKA Key in step 408. That is, the IA, AA, and Device have a pre-arranged method to identify which Primary SKA Key to use in any particular application of this authentication protocol. Should the SKA Core be constructed such that each Primary Key is enciphered under a different public key, then this AA may in fact only be able to decrypt one.

The AA then uses the Primary SKA Key to generate the two Secondary SKA Keys, one for encrypting, and one for MACs in step 410. Techniques for this generation include:

Using the primary SKA key to encrypt two predetermined constants. The encryption of one constant is the encryption key, and the encryption of the other is the MAC key in a preferred embodiment.

Using the key derivation procedure of the standard ANSI X9.42.

Adopting the convention that the Primary Key equals the concatenation of the other keys (e.g., $K_0=K_1\|K_2$).

Meanwhile, the Device retrieves the appropriate Primary SKA key from its secure memory in step 412 and uses the same scheme as the AA to generate the same secondary keys in step 414.

The AA in step 416 and the Device in step 418 then each generate or obtain a nonce for this session. This nonce can be obtained in many ways, including:

Using random-number generation, if such an ability is present;

Using the primary SKA key to encrypt some internal state variable that is guaranteed to be non-repeating.

Figure 5:
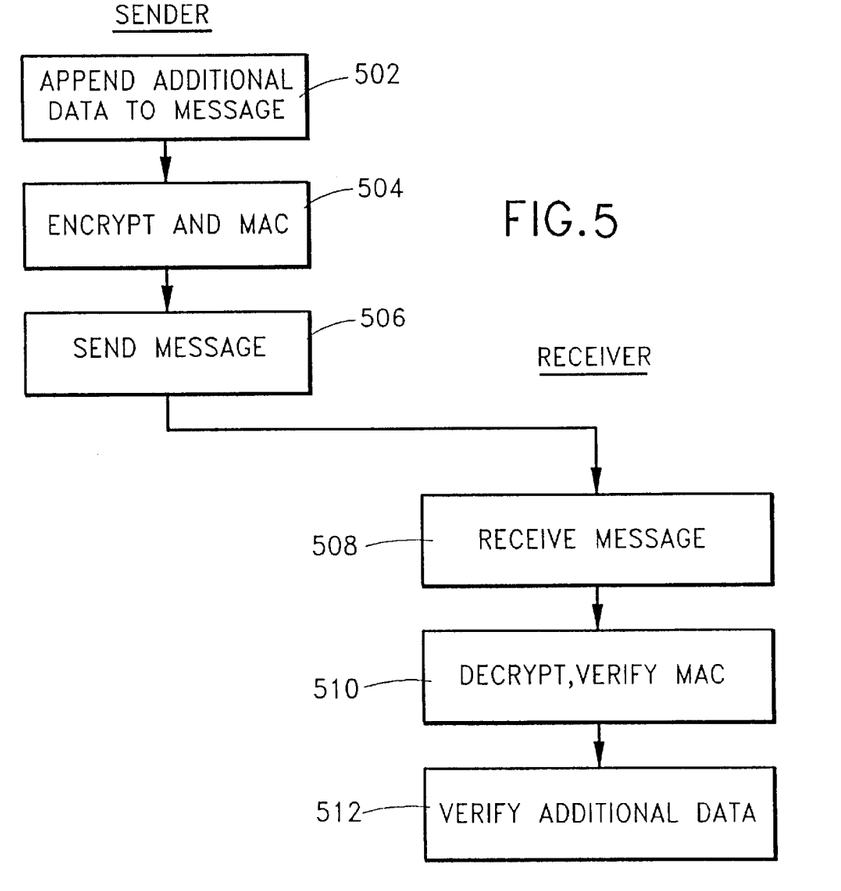
FIG. 5 illustrates how an authenticating authority (AA) and a Device exchange a sequence of messages which are authenticated.

The AA and the Device then exchange a sequence of messages in step 420 that are authenticated as illustrated in FIG. 5. If a received message fails the test of FIG. 5, then the receiver rejects it and aborts the protocol.

The format and pattern of these messages is flexible. In a preferred embodiment, the sequence is organized into a series of one or more rounds, which consist of the AA sending a challenge, and the Device then sending a response. The first challenge and response contain no actual data, but serve instead to establish the authenticated channel.

SCENARIO: Sending and Receiving a SKA-Authenticated Message

FIG. 5 illustrates sending and receiving SKA-Authenticated messages. Assume that the Sender and Receiver have already established shared Secondary Authentication Keys, and have each generated their own nonce for this session.

To send a message with particular text, the Sender takes the text of the message, and adds additional data in step 502 including a sequence number, his or her nonce, the Receiver's nonce (if the Sender has received it), and the direction of this message (from AA to Device, or vice-versa).

Figure 6:
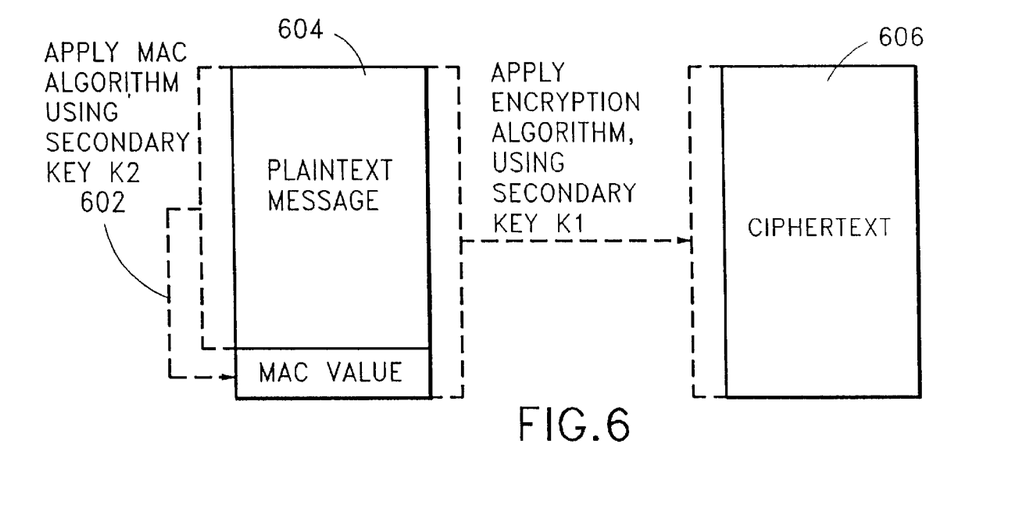
FIG. 6 illustrates an exemplary diagram for a MAC algorithm.

The Sender then encrypts and MACs the message, as illustrated in FIG. 6, using the secondary SKA keys in step 504. Thus, only another party with that encryption key can understand the contents, and only another party with that MAC key could have generated the contents. In a preferred embodiment, we generate the MAC first, append that to the rest of the message and additions, and then encrypt the entire body. However, in other embodiments one could also encrypt first, and generate the MAC from either the ciphertext or the plaintext.

The Sender then sends the message to the Receiver in step 506, who receives it in step 508.

The Receiver uses the Secondary SKA Keys to decrypt the message and verify the MAC in step 510. If the additional data is also correct, the receiver accepts the messages as authentic in step 512.

FIG. 6 illustrates an exemplary diagram for a MAC algorithm, reference Section 18.14 in Bruce Schneier, Applied Cryptography (2nd Edition), John Wiley & Sons, 1966, in which a MAC algorithm is applied using secondary key K2 at 602, and a plaintext message at 604 is transformed to a ciphertext at 606 by applying an encryption algorithm using secondary key K1.

Implementation Options

If authentication is successful, then the AA might choose to re-initialize the card, right away or possibly in the future depending upon other circumstances, (for example, in order to limit the amount of ciphertext/known-plaintext pairs that an eavesdropper might accumulate for any one key). If authentication of the Device fails, the AA might consider blacklisting that SKA Certificate and/or confiscating that Device.

To protect against brute-force and other attacks, the Device may count unsuccessful attempts to use these techniques. Should too many tries occur, the Device could then respond, such as by shutting down, or by blocking additional attempts for a sufficiently long time interval.

Depending upon the designer's concern over the strength of the encryption (particularly if Device memory limits the keysize), in some embodiments the designer might wish to use a private communication channel between an alleged Authority and an alleged Device. For example, single-DES (Data Encryption Standard, Chapter 12, Bruce Schneier, Applied Cryptography (2nd Edition), John Wiley and Sons, 1996) is believed to be vulnerable today to brute-force attacks from specialized hardware, and this vulnerability will only increase with time. If the designer fears such attacks but only can use single-DES, then keeping the communication channel private is a good choice.

The designer may choose to layer additional protocols on top of the procedures of the present invention, as in the following example.

An untampered device may have had all of its volatile memory zeroized, and may possess only a small amount of secret data (including a Primary SKA Key) in nonvolatile EEPROM. To help protect this data from an attacker who has physically compromised the Device, the designed embodiment may:

include in this data a Challenge Secret and Response Secret;

store this data inside a microcontroller chip;

have the microcontroller firmware refuse to release the Response, unless it is first presented with the correct Challenge;

have the microcontroller count (non-volatilely) the number of unsuccessful attempts to enter Challenge, and permanently destroy the data if too many are attempted.

This forces the attacker to physically open and probe the microcontroller chip, to learn the Response Secret.

For Devices using such a technique, the designed embodiment may layer this challenge-response on top of the procedures of the present invention (e.g., the first AA-to-Device SKA data messages may contain the Challenge Secret, and the Device-to-AA SKA response may contain the Response Secret).

FIG. 7 illustrates a logic flow diagram for the Challenge-Response procedure. The Challenge Secret and Response Secret are installed as part of initialization and stored within the SKA Certificate; an Authenticating Authority must successfully complete this protocol (e.g., know the real Challenge Secret) in order to re-initialize these secrets.

At step 702, the present invention is used by the AA to establish an authenticated channel with the Device. At step 704 the Challenge Secret is transmitted to the Device, which forwards the Challenge Secret to its microcontroller at step 706. At step 708, the "unsuccessful attempts" count in the microcontroller is incremented, and if that count reaches a maximum value, a self-destruct command is issued at step 710. If the unsuccessful attempts count is not at a maximum, the Challenge Secret is accepted at step 712. If incorrect, the procedure is halted at step 716, and if correct, at step 714 the unsuccessful attempts count is reset to zero. The Response Secret is released to the Device at step 718, and the Response Secret is forwarded by the Device to the AA at step 720, which verifies that the Response Secret is correct at step 722.

The Device may be implementing an application program on behalf of a Program Authority (PA) who does not trust the AA. In this case, the designer might implement the present invention so that its successful use causes any sensitive data associated with this application program to be automatically destroyed. In this way, abuse of the Device's SKA secrets by the AA cannot compromise the integrity of the PA's distributed application.

While several embodiments and variations of the present invention for authentication for secure devices with limited cryptography are described in detail herein, it should be apparent that the disclosure and teachings of the present invention will suggest many alternative designs to those skilled in the art.

Having thus described the invention, what is claimed as new and desired to be secured by Letters Patent is:

1. A secure device comprising:
   a. a receiver means for receiving an authenticated communication from an installation authority which includes an authenticating authority public key and a commence SKA initialization signal and for receiving an SKA certificate signed with an installation authority private key;
   b. a transmitter means for transmitting an SKA core to said installation authority;
   c. a generator means for generating a set of primary SKA keys in response to said commence SKA initialization signal; and
   d. an encoder means for enciphering said primary SKA keys with said authenticating authority public key and to form an SKA core.

2. A device as recited in claim 1, wherein said transmitter means makes said SKA certificate available to a third party upon request.

3. A device as recited in claim 1, wherein said receiver means also receives an installation authority public key from an installation authority to authenticate said installation authority.

4. A device as recited in claim 1, wherein said transmitter also transmits device authentication parameters to said installation authority to enable said installation authority to authenticate said device.

5. A method for authenticating a secure device comprising the following steps by the secure device:
   a. receiving an authenticated communication from an installation authority which includes an authenticating authority public key and a commence SKA initialization;
   b. generating a set of primary SKA keys;
   c. enciphering said primary SKA keys with said authenticating authority public key and forming an SKA core;
   d. transmitting said SKA core to said installation authority; and
   e. receiving an SKA certificate signed with an installation authority private key.

6. A method as claimed in claim 5, further comprising making said SKA certificate available to a third party upon request.

7. A method as recited in claim 5, further including receiving an installation authority public key from an installation authority to authenticate said installation authority.

8. A method as recited in claim 5, further including outputting device authentication parameters to said installation authority, enabling said installation authority to authenticate said device.

* * * * *